(12) United States Patent
Penner et al.

(10) Patent No.: US 8,100,463 B2
(45) Date of Patent: Jan. 24, 2012

(54) INTEGRATED BRACKETS FOR VEHICLE INSTRUMENT PANELS

(75) Inventors: Benjamin Warren Penner, Ann Arbor, MI (US); Atsushi Kobayashi, Nagoya (JP)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 1051 days.

(21) Appl. No.: 11/971,223

(22) Filed: Jan. 9, 2008

(65) Prior Publication Data

US 2009/0174223 A1  Jul. 9, 2009

(51) Int. Cl.
*B62D 25/08* (2006.01)
(52) U.S. Cl. ..................... 296/193.02; 296/72
(58) Field of Classification Search ............... 296/30, 296/70, 72, 193.01, 193.02; 280/727
See application file for complete search history.

(56) References Cited

U.S. PATENT DOCUMENTS

| | | | |
|---|---|---|---|
| 4,400,011 A | 8/1983 | Matsumo | |
| 5,238,286 A | 8/1993 | Tanaka et al. | |
| 5,934,733 A | 8/1999 | Manwaring | |
| 6,669,273 B1 | 12/2003 | Glovatsky et al. | |
| 6,843,521 B1 | 1/2005 | Oana | |
| 6,851,742 B1 | 2/2005 | Kubiak | |
| 2002/0003354 A1 | 1/2002 | Inoue et al. | |
| 2005/0110302 A1 | 5/2005 | Riha et al. | |
| 2007/0210616 A1 | 9/2007 | Wenzel et al. | |
| 2008/0265607 A1* | 10/2008 | Biggs et al. | 296/72 |

* cited by examiner

*Primary Examiner* — Dennis Pedder
*Assistant Examiner* — Jason S Daniels
(74) *Attorney, Agent, or Firm* — Dinsmore & Shohl LLP

(57) ABSTRACT

An integrated bracket for attaching multiple components to a vehicle instrument panel reinforcement includes a first attachment portion and a second attachment portion. The first attachment portion is configured to receive a first component and the second attachment portion is configured to receive a second component. The integrated bracket also includes at least one flange for attaching the integrated bracket to an instrument panel reinforcement.

20 Claims, 5 Drawing Sheets

INTEGRATED BRACKETS FOR VEHICLE INSTRUMENT PANELS

TECHNICAL FIELD

The present invention relates to support brackets for automotive instrument panels and, more specifically, to integrated brackets for attaching multiple components to vehicle instrument panel reinforcements.

BACKGROUND

Vehicles generally contain instrument panels located in front of the driver's and passenger's seats. The instrument panel may contain a variety of components including meters, gages, audio and video accessories, HVAC accessories, airbags and the like. While the instrument panel itself may provide some support for these components, the instrument panel and components may generally be attached to an instrument panel reinforcement (IPR) such that the IPR supports both the instrument panel and the various components contained in the instrument panel. The IPR may also serve as an attachment point for various structural members, such as the steering column support bracket, the cowl bracket, and driver and passenger side braces.

To facilitate the attachment of the instrument panel and the various components and structural members to the IPR, the IPR may comprise a plurality of purpose-built brackets. For example, driver and passenger braces may be connected to the IPR via brace brackets while audio components may be connected to the IPR through audio brackets. Other individual components may have a corresponding bracket or brackets by which that specific component is connected to the IPR.

The problem with such a design is that separate brackets are required for each component that is attached to the IPR. As such, a bracket or pair of brackets must be separately welded to the IPR for each component. Moreover, the brackets for each component may have a different design than a bracket for another component. Accordingly, the brackets for each component are generally manufactured using separate tooling. The extra material, tooling, labor, and time all serve to increase the overall cost of the vehicle.

Accordingly, a need exists for an integrated bracket for attaching multiple components to the instrument panel reinforcement of a vehicle.

SUMMARY

According to one embodiment, an integrated bracket for attaching multiple components and support structures to an instrument panel reinforcement may include a base with a front edge, a rear edge, a top edge, and a bottom edge. The integrated bracket may also include a first attachment portion having at least one connector and a second attachment portion having at least one connector. The first attachment portion extends from the front edge of the base while the second attachment portion extends from one of the top edge of the base or the bottom edge of the base. The first attachment portion is configured to receive a first component while the second attachment portion is configured to receive a second component such that the first and second components may be attached to the instrument panel reinforcement of a vehicle via the integrated bracket.

In another embodiment, an instrument panel reinforcement for a vehicle may include at least one integrated bracket for attaching multiple components and support structures to the instrument panel reinforcement. The integrated bracket may include a base with a front edge, a rear edge, a top edge, and a bottom edge. The integrated bracket may also include a first attachment portion having at least one connector and a second attachment portion having at least one connector. The first attachment portion extends from the front edge of the base while the second attachment portion extends from one of the top edge of the base or the bottom edge of the base. The first attachment portion is configured to receive a first component while the second attachment portion is configured to receive a second component such that the first and second components may be attached to the instrument panel reinforcement via the integrated bracket.

In another embodiment, a method of assembling an instrument panel module for a vehicle may include providing a vehicle instrument panel reinforcement having at least one integrated bracket for attaching multiple components to the instrument panel reinforcement. The integrated bracket may include a base with a front edge, a rear edge, a top edge, and a bottom edge. The integrated bracket may also include a first attachment portion having at least one connector and a second attachment portion having at least one connector. The first attachment portion extends from the front edge of the base while the second attachment portion extends from one of the top edge of the base or the bottom edge of the base. The first attachment portion is configured to receive a first component while the second attachment portion is configured to receive a second component such that the first and second components may be attached to the instrument panel reinforcement of a vehicle via the integrated bracket. The method of assembling an instrument panel module for a vehicle also includes providing a first component and a second component and attaching the first and second components to the instrument panel reinforcement via the integrated bracket.

BRIEF DESCRIPTION OF THE DRAWINGS

The following detailed description of the illustrative embodiments can be read in conjunction with the following drawings in which.

DETAILED DESCRIPTION OF THE ILLUSTRATIVE EMBODIMENTS

Figure 1A:
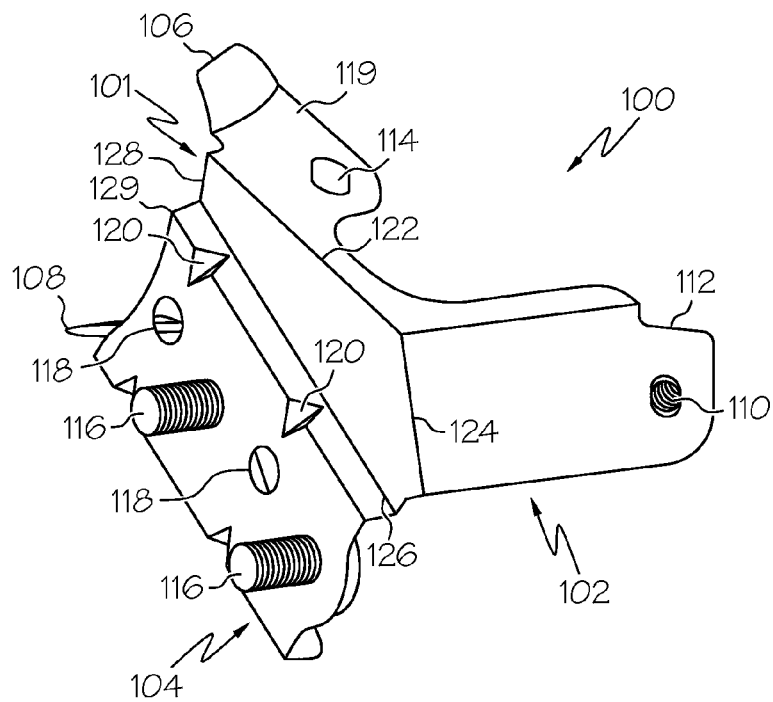
FIG. 1A depicts a perspective view of an integrated bracket for a vehicle in accordance with one embodiment described herein.

FIG. 1A illustrates an integrated bracket that may be used in conjunction with a vehicle instrument panel reinforcement (IPR) to facilitate attaching multiple components and/or structural members to the IPR using a single bracket. The integrated bracket may generally comprise a base, a first flange, a second flange, a first attachment portion, a second attachment portion, and a plurality of connectors. Each of these elements will be described more fully herein.

Figure 1B:
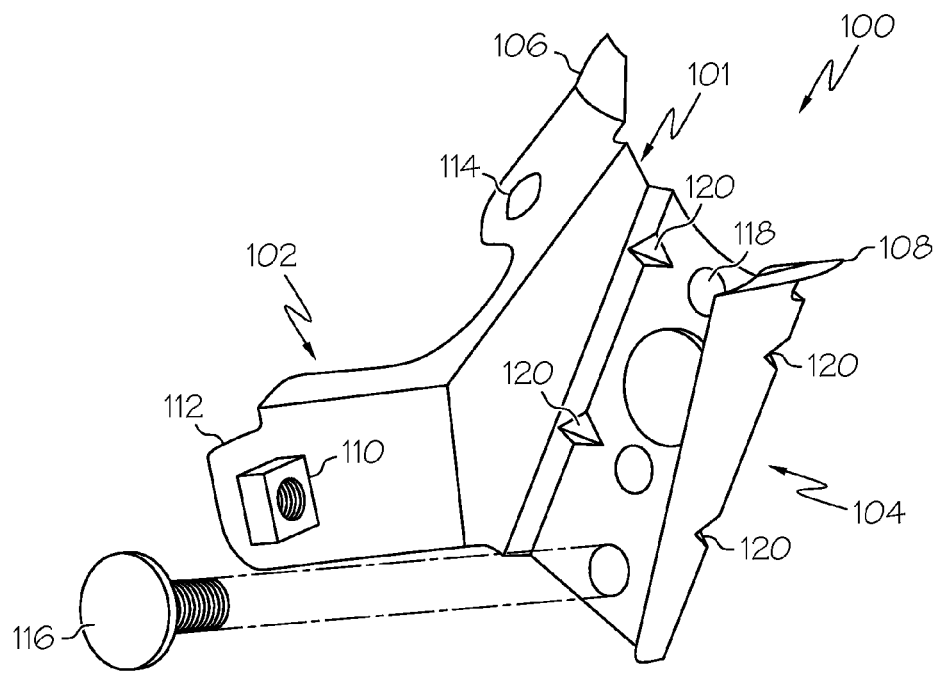
FIG. 1B depicts a perspective view of the bottom of the integrated bracket for a vehicle illustrated in FIG. 1A in accordance with one embodiment described herein.

Referring to FIGS. 1A and 1B, the integrated bracket 100 may comprise metal, plastic, or composite materials. In the embodiments of the integrated bracket 100 shown and described herein, the integrated bracket 100 is made from a single piece of sheet metal that is formed into the bracket via a stamping operation. However, as will be apparent to one skilled in the art, the integrated bracket 100 may be made from one or multiple pieces of metal utilizing a variety of metal forming processes including, without limitation, machining, forging, casting, welding, and the like.

The integrated bracket 100 may generally comprise a base 101 having a multi-sided, polygonal shape. In the embodiment shown and described herein, the base 101 is a four sided polygon having a front edge 124, a rear edge 128, a top edge 122, and a bottom edge 126. However, it will be understood that no particular limitation as to the number or orientation of the edges is intended. As such, the base 101 may generally comprise a polygon having any number of edges and may be a regular polygon, such as a square or rectangle, or an irregular polygon.

The integrated bracket 100 may also comprise a first attachment portion 102 and a second attachment portion 104 with each attachment portion 102, 104 extending from an edge of the base 101. The first attachment portion 102 may extend from the front edge 102 of the base 101. The first attachment portion 102 may be substantially perpendicular to the plane of the base 100 such that the base 100 and the first attachment portion 102 have a substantially L-shaped configuration with respect to one another.

The first attachment portion 102 may comprise a connector, specifically a weld nut 110. The weld nut 110 may be positioned in a hole in the first attachment portion 102. The weld nut 110 may be located distally from the front edge 124 of the base 101. As shown in FIG. 1B, the weld nut 110 may be spot welded to the posterior side of the first attachment portion 102 such that a bolt or other corresponding connector may be threaded into the weld nut 110 from the anterior side of the first attachment portion 102.

While the embodiment of the integrated bracket 100 shown in FIGS. 1A and 1B depicts the first attachment portion 102 as comprising a weld nut 110, it should be understood that any connector suitable for receiving a corresponding connector may be positioned on the first attachment portion 102 such that a component may be attached to the first attachment portion 102. Accordingly, the connector positioned on the first attachment portion 102 may include, without limitation, weld studs, clips, fin-type connectors and the like. Further, it will be understood that, while the embodiment of the integrated bracket 100 shown in FIGS. 1A and 1B depicts the first attachment portion 102 as comprising the female portion of a female-male connector pair, the connector positioned on the first attachment portion 102 may comprise the male portion of a female-male connector pair.

The first attachment portion 102 may also comprise a horizontal datum 112 distally located from the front edge 124 of the base 101 of the integrated bracket 100. The datum 112 may be used to orient and position accessories on the first attachment portion 102 of the integrated bracket 100. The horizontal datum 112 may also be used as a temporary attachment point for components while the component is being installed on the integrated bracket 100 as will be discussed further herein.

As discussed, the integrated bracket 100 may also comprise a second attachment portion 104 extending from the bottom edge 126 of the base 101. The second attachment portion may generally be co-planar or parallel to the base 101. In the embodiment of the integrated bracket 100 shown and described herein, the second attachment portion 104 is offset from the base 101 by a 90° degree jog 129 disposed between the bottom edge 126 of the base 101 and the second attachment portion 104. As such, the second attachment portion 104 shown in FIGS. 1-4 is offset from and parallel to the base 101 of the integrated bracket 100 and substantially orthogonal to the first attachment portion 102. When the second attachment portion 104 is offset from the base 101 as shown in FIGS. 1A and 1B, the second attachment portion 104 may be formed with darts 120 stamped into the second attachment portion 104 where the sheet metal of the bracket is folded 90°. The darts 120 improve the rigidity of the sheet metal in the folded area and, therefore, improve the rigidity of the integrated bracket 100.

It should be understood that, while the embodiment of the integrated bracket 100 shown in FIGS. 1-4 depicts the second attachment portion 104 as being offset and parallel to the base 101, the second attachment portion 104 may extend directly from the bottom edge 126 of the base 101 such that the second attachment portion is co-planar with the base 101 and orthogonal to the first attachment portion 102. Further, while the second attachment portion 104 is shown in FIGS. 1-4 as extending from the bottom edge 126 of the base 101, it should be understood that the second attachment portion 104 may extend from the top edge 122 of the base 101 and have the same orientation relative to the base 101 and the first attachment portion 102 as depicted in FIGS. 1-4.

As shown in FIGS. 1-4, the second attachment portion 104 may comprise a connector, specifically a threaded weld stud 116. The weld stud 116 is inserted through a hole in the second attachment portion 104 on the side of the second attachment portion 104 proximate the base 101 and spot-welded into place. The weld stud 116 extends from the distal side of the second attachment portion 104 and is substantially perpendicular to the plane of the second attachment portion 104. In the embodiment of the integrated bracket 100 shown and described herein, the second attachment portion 100 comprises two weld studs 116.

It should be understood that, while the second attachment portion 104 is shown and described herein as having a pair of weld studs 116 extending from the second attachment portion 104, no particular limitation as to the type of connector located on the second attachment portion 104 is intended. Accordingly, the connector may comprise a weld stud, a weld nut, a clip, a fin-type connector or any other connector for attaching a component to the second attachment portion 104 including. Further, it will be understood that, while the embodiment of the integrated bracket 100 shown in FIGS. 1A and 1B depicts the second attachment portion 104 as comprising the male portion of a female-male connector pair, the connector positioned on the second attachment portion 104 may comprise the male portion of a female-male connector pair.

The second attachment portion 104 may also comprise two circular datums 118. The datums 118 are holes in the second attachment portion 104 that facilitate positioning and fixturing the integrated bracket 100 during the manufacture of the integrated bracket 100. The datums 118 may also be used when attaching the integrated bracket 100 to an instrument panel reinforcement, as will be discussed further herein.

Specific reference has been made herein to the positioning and orientation of the first attachment portion 102 and the second attachment portion 104 relative to the base 101. However, it should be understood that the position and orientation of the first attachment portion 102 and the second attachment portion 104 relative to the base 101, as described herein, are merely exemplary in nature. Accordingly, the first attachment portion 102 need not be substantially perpendicular to the base 101 and the second attachment portion 104 need not be parallel to or co-planar with the base 101. Instead, the first attachment portion 102 and the second attachment portion 104 may be of any suitable orientation relative to the base 101 so as to facilitate the attachment of multiple components to the integrated bracket 100.

Still referring to FIGS. 1A and 1B, the integrated bracket 100 may also comprise a first flange 106 and a second flange 108 which facilitate the attachment of the bracket 100 to a vehicle instrument panel reinforcement (IPR). In the embodiment of the integrated bracket 100 shown and described herein, the first flange 106 may be integral with a bracket reinforcement 119 extending between the upper edge 122 of the base 101 and the first attachment portion 102. The bracket reinforcement 119 improves the rigidity of the first attachment portion 102 with respect to the base 101. The bracket reinforcement 119 is generally perpendicular to both the base 101 and the first attachment portion 102. The bracket reinforcement 119 may comprise an opening 114 for receiving a wire harness clip or similar attachment. The first flange 106 may extend out of the plane of the bracket reinforcement 119 proximate the rear edge 128 of the base 101. The first flange 106 is generally positioned at an angle to the bracket reinforcement 119.

The second flange 108 may be integrally formed with the second attachment portion 104. The second flange 108 may extend from the posterior of the second attachment portion 104 proximate the rear edge 128 of the base 101. The second flange 108 may generally extend from the posterior of the second attachment portion 104 such that the first flange 106 and the second flange 108 diverge from one another.

As discussed herein, the first flange 106 and the second flange 108 facilitate the attachment of the integrated bracket 100 to a vehicle IPR. In the embodiment of the integrated bracket 100 shown and described herein, the first flange 106 and the second flange 108 are configured such that the first flange 106 and the second flange 108 may be welded to the IPR thereby facilitating the attachment of the integrated bracket 100 to the IPR. However, it should be understood that the flanges 106, 108 may be configured with holes such that the integrated bracket 100 may be attached to the IPR via fasteners, such as bolts or screws, inserted through the holes and threaded into the IPR.

Figure 2:
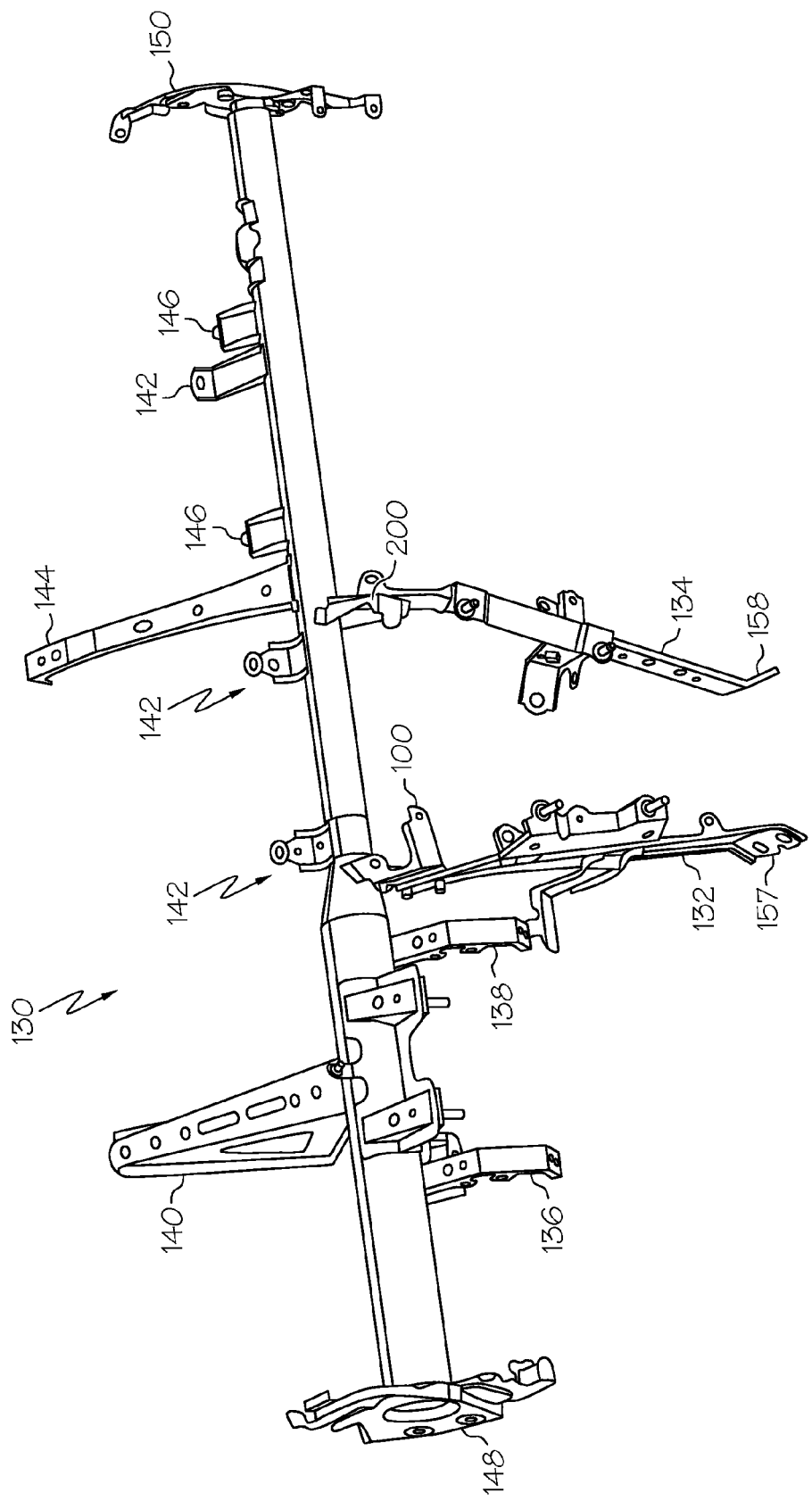
FIG. 2 depicts a perspective view of a pair of integrated brackets attached to a vehicle instrument panel reinforcement in accordance with one embodiment described herein.
Figure 3:
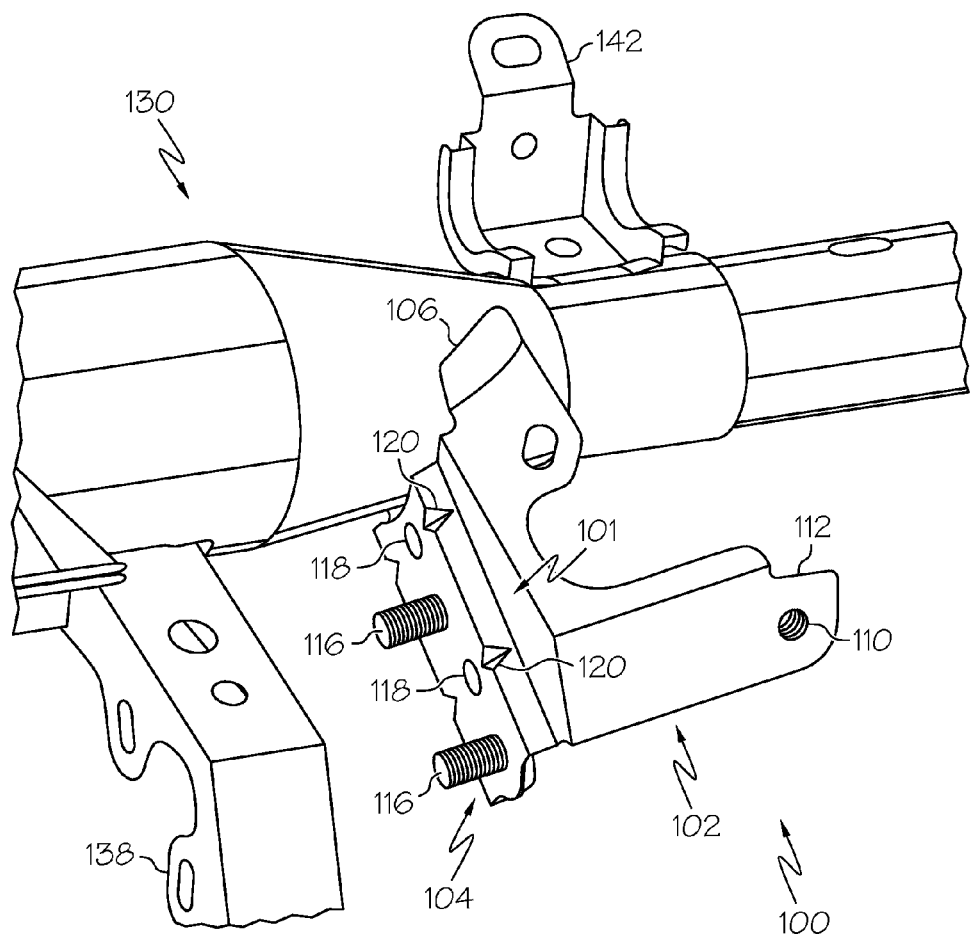
FIG. 3 depicts an integrated bracket attached to a vehicle instrument panel reinforcement in accordance with one embodiment described herein.
Figure 4:
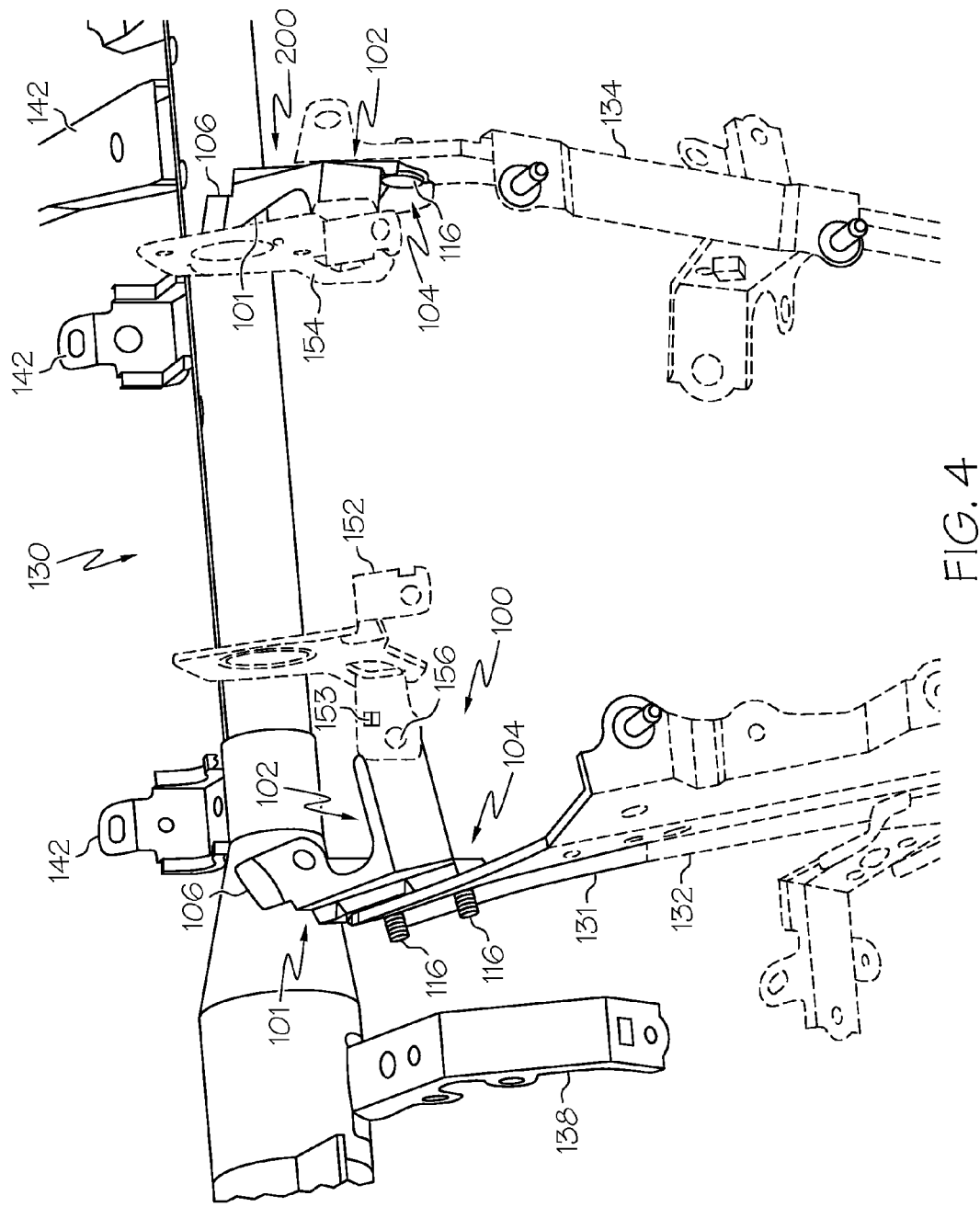
FIG. 4 depicts a pair of integrated brackets attached to a vehicle instrument panel reinforcement with structural members and accessory brackets attached to the integrated brackets in accordance with one embodiment described herein.
Figure 5:
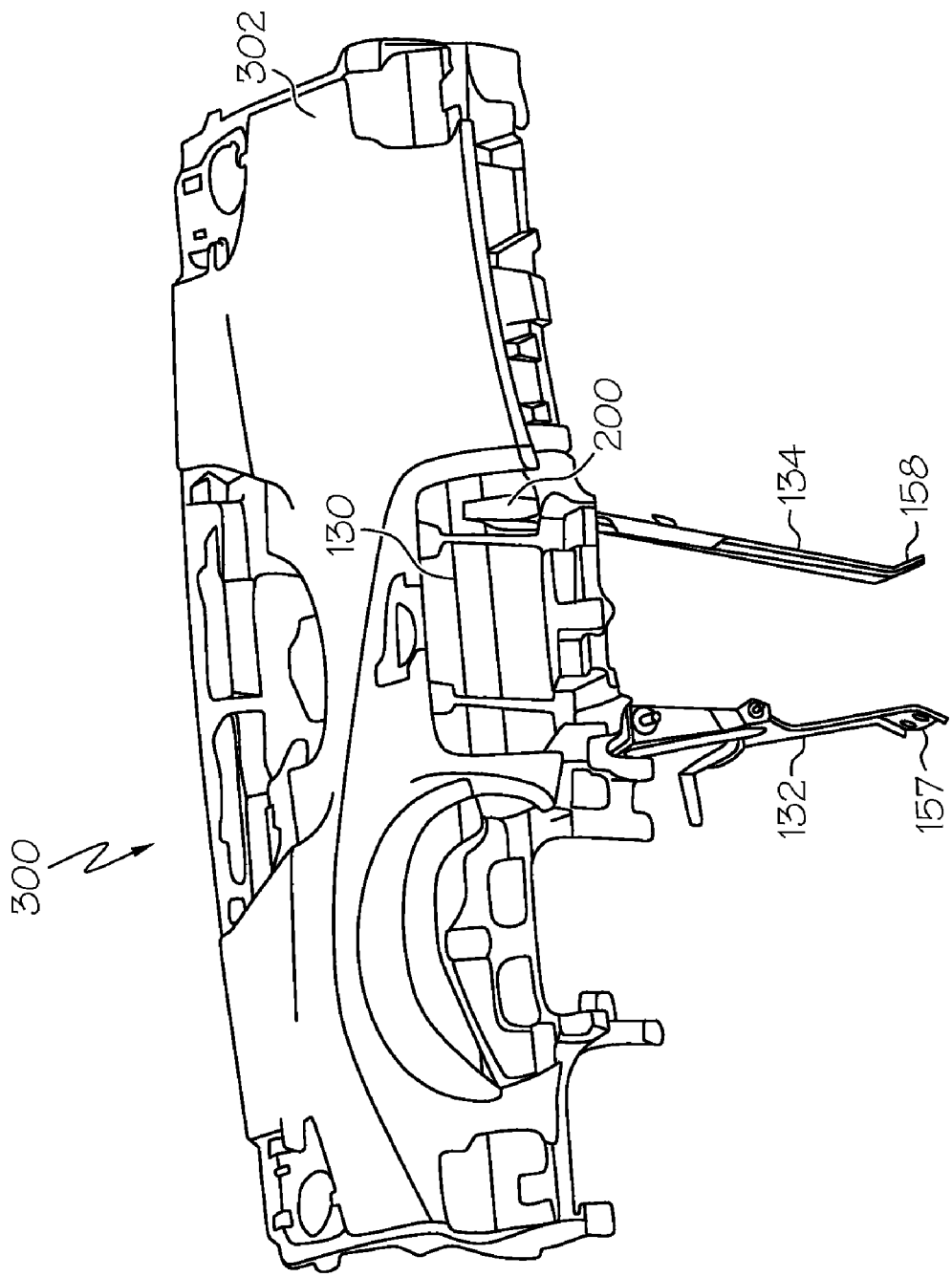
FIG. 5 depicts an instrument panel module comprising an instrument panel reinforcement having integrated brackets according to one embodiment described herein.

Referring now to FIGS. 2-4, a pair of integrated brackets 100, 200 is shown attached to an IPR 130. The IPR 130 is a tubular structure which supports the instrument panel of a vehicle as well as components positioned in the instrument panel including, without limitation, various meters, gages, HVAC accessories, airbags, audio accessories and the like. The IPR 130 may also support various structural components such as the steering column, the brake pedal, the cowl and the like. When the instrument panel 302 is installed on to the IPR 130 (as shown in FIG. 5), the instrument panel 302 and IPR 130, together, form the instrument panel module 300 of a vehicle.

As discussed herein, the IPR 130 supports various accessories and structural members using brackets attached to the IPR 130. These brackets may include, among others, energy absorbing brackets 136, 138, the steering column support bracket 140, the HVAC brackets 142, the cowl support bracket 144 and passenger airbag support brackets 146. As shown in FIGS. 2-4, a pair of integrated brackets 100, 200 may also be attached to the IPR 130. The pair of integrated brackets 100, 200 shown in FIGS. 2 and 4 facilitate the attachment of multiple components to the IPR 130. In the embodiment shown and described herein, the integrated brackets 100, 200 are configured to attach the driver's side brace 132, the passenger side brace 134 and the audio brackets 152, 154 to the IPR 130 using a single pair of integrated brackets 100, 200 as opposed to two pairs of brackets, one each for the driver and passenger side braces 132, 134 and the audio brackets 152, 154, as would normally be required.

The integrated brackets 100, 200 may be attached to the IPR 130 via the first flange 106 and the second flange 108 as shown in FIG. 3. Referring specifically to the driver's side integrated bracket 100 illustrated in FIG. 3 by way of example, the rear edge 128 of the base 101 and the posterior of the second attachment portion 104, where the integrated bracket 100 intersects with the IPR 130, are generally contoured to conform to the contours of the IPR 130. The first flange 106 and the second flange 108 extend from the integrated bracket 100 along the same general contour such that the rear edge of the base 101, the posterior of the second attachment portion 104, the first flange 106 and the second flange 108, together, have a generally C-shaped configuration in which the IPR 130 is received. To properly position the bracket 100 on the IPR 130 during the attachment process, the datums 118 may be used to locate the bracket 100 in the proper position and orientation on the IPR 130.

To install the integrated bracket 100 on to the IPR 130, the integrated bracket 100 is positioned on the IPR 130 such that IPR 130 is disposed between the flanges 106, 108 and the rear edge 128 and the posterior of the second attachment portion 104 contact the IPR 130. In this position, the integrated bracket 100 is generally orthogonal to the IPR 130 and the first flange 106 and second flange 108 are in contact with, and generally follow the contours of the IPR 130. The bracket 100 is then attached to the IPR 130 by welding the first flange 106 and the second flange 108 to the IPR. In the embodiment shown in FIGS. 2-4, the bracket 100 is attached to the IPR 130 by mig welding the first flange 106 and the second flange 108 to the IPR 130. However, it should be understood that any suitable welding technique may be used to attach the bracket 100 to the IPR 130, including, without limitation, laser welding, tig welding, spot welding and the like.

Further, while the bracket 100 shown in FIGS. 2-4 is attached to the IPR 130 via a welding operation, it should be understood that the bracket 100 may be attached to the IPR 130 using screws, bolts, or other similar fastening systems as may be known in the art such that the bracket 100 is firmly secured to the IPR 130. It should also be understood that the integrated brackets 100, 200 described herein may be attached to the IPR 130 prior to the incorporation of the IPR 130 into the instrument panel module 300 of the vehicle and prior to the installation of the instrument panel module 300 into the base of a vehicle. However, the integrated brackets 100 may also be attached to the IPR 130 after the IPR 130 has been installed in the vehicle.

In the embodiment of the integrated bracket 100 illustrated in FIGS. 2 and 4, a pair of integrated brackets 100, 200 are attached to the IPR 130 and oriented in opposition to one another. The pair of integrated brackets 100, 200 is configured to attach the driver's side brace 132, the passenger's side brace 134, the driver's side audio support 152, and the passenger's side audio support 154 to the IPR 130. The driver's side brace 132 and driver's side audio support 154 may be attached to the integrated brackets 100 in the same manner as the passenger's side brace 134 and the passenger's side audio support 154 are attached to the passenger's side integrated bracket 200. Accordingly, the attachment of the braces 132, 152 and the audio supports 152, 154 to the integrated brackets 100, 200 will be described with specific reference to the driver's side integrated bracket 100, the driver's side brace 132 and the driver's side audio support 152.

Referring to FIGS. 2 and 4, the upper end 131 of the driver's side brace 132 may comprise a pair of holes (not shown). The holes are configured to receive the weld studs 116 located on the second attachment portion 104 of the integrated bracket 100. To attach the driver's side brace 132 to the integrated bracket 100, the driver's side brace 132 may be positioned proximate the second attachment portion 104 of the integrated bracket 100 such that the weld studs 116 are aligned with the holes in the driver's side brace 132. The driver's side brace 132 may then be positioned on the integrated bracket 100 such that the weld studs 116 are inserted through the holes on the driver's side brace 132. Nuts (not shown) may then be threaded on to the weld studs 116 and tightened thereby securing the driver's side brace 132 to the driver's side integrated bracket 100. It should be understood that the passenger's side brace 134 may be attached to the passenger's side integrated bracket 200 in a similar manner.

Referring to FIG. 4, the driver's side audio support 152 comprises a clip 153 and a mounting hole 156. The clip 153 may be used to orient the driver's side audio support 152 with respect to the integrated bracket 100 and to temporarily fasten the driver's side audio support 152 to the driver's side integrated bracket 100 during installation. To attach the driver's side audio brace 152 to the integrated bracket 100, the driver's side audio brace 152 may be positioned on the first attachment portion 102 of the integrated bracket 100 such that the clip 153 is engaged with the H-datum 112. With the clip 153 properly engaged with the H-datum 112, the mounting hole 156 of the driver's side audio support 152 may be aligned with the weld nut 110 located on the first attachment portion 102 of the integrated bracket 100. A bolt or other threaded fastener (not shown) may be inserted through the mounting hole 156 and threaded into the weld nut 110 thereby securing the driver's side audio support 152 to the driver's side integrated bracket 100. It should be understood that the passenger's side audio support 154 may be attached to the passenger's side integrated bracket 200 in a similar manner.

With the driver's side and passenger's side braces 132, 134 and audio supports 152, 154 attached to the IPR 130 via the integrated brackets 100, 200, the instrument panel 302 may be installed on to the IPR 130 thereby forming the instrument panel module 300, as shown in FIG. 5. Various components may then be installed in the instrument panel module 300 and attached to the brackets extending from the IPR 130. For example, after the instrument panel 302 is installed on the IPR 130, an audio head unit may be inserted into the instrument panel module 300 and attached to the audio support brackets 152, 154, which are, in turn, attached to the integrated brackets 100, 200. After the components are installed in the instrument panel module 300, the instrument panel module 300 may then be installed in the vehicle (not shown) where the lower end 157 of the driver's side brace 132 and the lower end 158 of the passenger's side brace 134 are attached to the floor tunnel (not shown) of the vehicle.

While specific examples and embodiments shown and discussed herein relate to the use of the integrated brackets described herein to facilitate the attachment of driver and passenger braces and audio components to an IPR, it should be understood that the integrated brackets may also be configured to attach various other combinations of components, accessories and structural members to the IPR including, without limitation, HVAC components, various electronic control units (ECUs), the transmission shifter, and the like.

Further, while the integrated brackets are shown and described as containing a first attachment portion and a second attachment portion thereby combining two brackets into a single bracket, the integrated brackets may comprise more than two attachment portions such that three or more brackets are combined into a single integrated bracket.

It should now be understood that the integrated brackets described herein reduce or eliminate the need for attaching multiple, separate brackets to the instrument panel reinforcement of a vehicle. Because fewer brackets are attached to the IPR, the amount of welding required to attach the brackets to the IPR is reduced which, in turn, reduces labor and material costs associated with assembling the vehicle. Further, combining multiple individual brackets into one integrated bracket also reduces the amount of tooling required to form the various brackets thereby further reducing costs.

Moreover, the integrated brackets described herein improve the overall fit of various components attached to the IPR, including the fit of the integrated bracket itself. When multiple individual brackets are attached to the IPR, each bracket is designed with a certain tolerance which may be used to compensate for variations in the bracket itself or to compensate for variations in the components and structures attached to the bracket. However, by combining multiple individual brackets into one integrated bracket, the overall number of pieces installed on the IPR is reduced thereby reducing the potential for variation. Accordingly, the tolerances associated with any one particular component may be decreased thereby providing an improved fit.

While particular embodiments and aspects of the present invention have been illustrated and described herein, various other changes and modifications can be made without departing from the spirit and scope of the invention. Moreover, although various inventive aspects have been described, such aspects need not be utilized in combination. It is therefore intended that the appended claims cover all such changes and modifications that are within the scope of this invention.

What is claimed is:

1. An integrated bracket for attaching multiple components to a vehicle instrument panel reinforcement comprising:
   a base;
   a first attachment portion having at least one connector;
   a second attachment portion having at least one connector;
   a first flange and a second flange for attaching the integrated bracket to a vehicle instrument panel reinforcement;
   wherein the base comprises a front edge, a rear edge, a top edge, and a bottom edge;
   wherein the first attachment portion extends from the front edge of the base;
   wherein the second attachment portion extends from one of the top edge of the base or the bottom edge of the base;
   the first flange extends from one of the top edge of the base or the bottom edge of the base and the second flange extends from the second attachment portion; and
   wherein the first attachment portion is configured to receive a first component and the second attachment portion is configured to receive a second component such that the first component and the second component may be attached to a vehicle instrument panel reinforcement via the integrated bracket.

2. The integrated bracket of claim 1 wherein the first attachment portion is substantially orthogonal to the base and the second attachment portion is co-planar with the base or the second attachment portion is in a plane parallel to the base such that the first attachment portion and the second attachment portion are substantially orthogonal to one another.

3. The integrated bracket of claim 1 wherein, when the second attachment portion extends from the top edge of the base, the second attachment portion is offset from the top edge of the base and, when the second attachment portion extends from the bottom edge of the base, the second attachment portion is offset from the bottom edge of the base.

4. The integrated bracket of claim 1 wherein the at least one connector of the first attachment portion comprises a weld nut.

5. The integrated bracket of claim 1 wherein the at least one connector of the second attachment portion comprises a threaded weld stud.

6. The integrated bracket of claim 1 wherein the first component comprises an audio support comprising a clip for orienting the audio support on the first attachment portion and at least one mounting hole wherein, when the audio support is properly oriented on the first attachment portion, the at least one mounting hole is aligned with the at least one connector of the first attachment portion.

7. The integrated bracket of claim 1 wherein the second component comprises a brace comprising an upper end and a lower end, the upper end of the brace having at least one hole configured to correspond with the at least one connector of the second attachment portion such that the brace may be attached to the integrated bracket via the connector.

8. An instrument panel reinforcement for a vehicle comprising at least one integrated bracket for attaching multiple components to the instrument panel reinforcement, wherein the at least one bracket comprises:
a base;
a first attachment portion having at least one connector; and
a second attachment portion having at least one connector;
wherein the base comprises a front edge, a rear edge, a top edge, and a bottom edge;
wherein the first attachment portion extends from the front edge of the base;
wherein the second attachment portion extends from one of the top edge of the base or the bottom edge of the base; and
wherein the first attachment portion is configured to receive a first component and the second attachment portion is configured to receive a second component such that the first component and the second component may be attached to the vehicle instrument panel reinforcement via the integrated bracket, the first component comprising an audio support having a clip for orienting the audio support on the first attachment portion and at least one mounting hole wherein, when the audio support is properly oriented on the first attachment portion, the at least one mounting hole is aligned with the at least one connector of the first attachment portion.

9. The instrument panel reinforcement of claim 8 wherein the at least one integrated bracket comprises a pair of integrated brackets oriented in opposition to one another on the instrument panel reinforcement.

10. The instrument panel reinforcement of claim 8 wherein the integrated bracket comprises at least one flange extending from one of the top edge of the base, the bottom edge of the base or the second attachment portion and the integrated bracket is attached to the instrument panel reinforcement via the at least one flange.

11. The instrument panel reinforcement of claim 8 wherein the first attachment portion is substantially orthogonal to the base and the second attachment portion is co-planar with the base or the second attachment portion is in a plane parallel to the base such that the first attachment portion and the second attachment portion are substantially orthogonal to one another.

12. The instrument panel reinforcement claim 8 wherein, when the second attachment portion extends from the top edge of the base, the second attachment portion is offset from the top edge of the base and, when the second attachment portion extends from the bottom edge of the base, the second attachment portion is offset from the bottom edge of the base.

13. The instrument panel reinforcement of claim 8 wherein the second component comprises a brace comprising an upper end and a lower end, the upper end of the brace having at least one hole configured to correspond with the at least one connector of the second attachment portion such that the brace may be attached to the integrated bracket such that the brace may be attached to the integrated bracket via the connector.

14. A method of assembling an instrument panel module for a vehicle comprising:
providing a vehicle instrument panel reinforcement having at least one integrated bracket for attaching multiple components to the instrument panel reinforcement wherein the integrated bracket comprises:
a base;
a first attachment portion having at least one connector; and
a second attachment portion having at least one connector;
wherein the base comprises a front edge, a rear edge, a top edge, and a bottom edge;
wherein the first attachment portion extends from the front edge of the base;
wherein the second attachment portion extends from one of the top edge of the base or the bottom edge of the base; and
wherein the first attachment portion is configured to receive a first component and the second attachment portion is configured to receive a second component such that the first component and the second component may be attached to the instrument panel reinforcement via the integrated bracket;
providing a first component and a second component;
attaching the first component to the first attachment portion of the integrated bracket;
attaching the second component to the second attachment portion of the integrated bracket; and
installing an instrument panel on the instrument panel reinforcement after the first component and the second component have been attached to the integrated bracket.

15. The method of assembling on instrument panel module of claim 14 wherein the first component comprises an audio support comprising a clip for orienting the audio support on the first attachment portion and at least one mounting hole wherein, when the audio support is properly oriented on the first attachment portion, the at least one mounting hole is aligned with the at least one connector of the first attachment portion.

16. The method of assembling an instrument panel module of claim 14 wherein the second component comprises a brace comprising an upper end and a lower end, the upper end of the brace having at least one hole configured to correspond with the at least one connector of the second attachment portion such that the brace may be attached to the integrated bracket via the connector.

17. The method of assembling an instrument panel module of claim 14, wherein the integrated bracket comprises a first flange and a second flange, wherein the first flange extends from one of the top edge of the base or the bottom edge of the base and the second flange extends from the second attachment portion.

18. The method of assembling an instrument panel of claim 14, wherein the first attachment portion is substantially orthogonal to the base and the second attachment portion is co-planar with the base or the second attachment portion is in a plane parallel to the base such that the first attachment portion and the second attachment portion are substantially orthogonal to one another.

19. The method of assembling an instrument panel of claim 14, wherein, when the second attachment portion extends from the top edge of the base, the second attachment portion is offset from the top edge of the base and, when the second attachment portion extends from the bottom edge of the base, the second attachment portion is offset from the bottom edge of the base.

20. The method of assembling an instrument panel of claim 14, wherein the at least one connector of the first attachment portion comprises a weld nut and the at least one connector of the second attachment portion comprises a threaded weld stud.

* * * * *